United States Patent
Uno et al.

[15] 3,649,316
[45] Mar. 14, 1972

[54] EXTRA HIGH EARLY-STRENGTH PORTLAND CEMENT

[72] Inventors: Tatujiro Uno, Kanagawa; Masatoshi Mochizuki, Tokyo, both of Japan

[73] Assignee: Onoda Cement Company, Limited, Onoda, Yamaguchi Prefecture, Japan

[22] Filed: July 15, 1969

[21] Appl. No.: 841,794

[30] Foreign Application Priority Data

July 20, 1968 Japan .................................... 43/51340

[52] U.S. Cl. ............................................ 106/89, 106/100
[51] Int. Cl. .......................................... C04b 7/02, C04b 7/48
[58] Field of Search ........................... 106/100, 101, 102, 89

[56] References Cited

UNITED STATES PATENTS

| | | | |
|---|---|---|---|
| 3,447,937 | 6/1969 | Hersey et al. | 106/102 |
| 3,298,843 | 1/1967 | Asano | 106/100 |
| 3,194,673 | 7/1965 | Schedel | 106/100 |
| 2,204,959 | 6/1940 | Frenkel | 106/100 |
| 1,829,082 | 10/1931 | Bergen | 106/101 |

FOREIGN PATENTS OR APPLICATIONS 12,741    1966    Japan .................................... 106/100

*Primary Examiner*—Tobias E. Levow
*Assistant Examiner*—W. T. Scott
*Attorney*—Fidelman, Wolfe & Leitner

[57] ABSTRACT

This invention is to provide Portland cement having extra high 1-day compressive strength composition of which is: the particular lime saturation degree = 0.95–1.03, $Cr_2O_3$ content = 1.2–2.6 percent by weight and ($Al_2O_3$+$Fe_2O_3$) content = 7.0–8.6 percent by weight, weight ratio of $Al_2O_3/Fe_2O_3$ being 1.65±0.50.

4 Claims, 3 Drawing Figures

EXTRA HIGH EARLY-STRENGTH PORTLAND CEMENT

BRIEF SUMMARY OF THE INVENTION

The present invention relates to the composition of Portland cement, which has extra high early-strength (especially 1-day compressive strength).

Hitherto, high early-strength Portland cement has been produced by preparing clinker which is higher in the hydraulic modulus and rich in alite content compared with the ordinary Portland cement. But if hydraulic modulus of the composition of clinker is made higher, it becomes difficult to burn it, especially in the rotary kiln of the ordinary type, and insufficient burning results in increase in free lime. Accordingly, 1-day compressive strength of Portland cement can not attain to more than 100 kg./cm.$^2$ by the Japanese Industrial Standards, JIS R 5201 (1964). Recently, however, civil engineering and construction circles are in need of Portland cement having extra high 1-day compressive strength upwards of 150 kg./cm.$^2$ by JIS R 5201 (1964).

The primary purpose of this invention is to provide Portland cement having 1-day compressive strength upwards of 150 kg./cm.$^2$ and other incidental purposes will be made clear from the following description. The mineral composition of early-strength Portland cement clinker consists of alite and interstitial materials which consist of glass phase, $C_4AF$ phase and $C_3A$ phase (here and hereinafter C, A and F represent CaO, $Al_2O_3$, and $Fe_2O_3$ respectively,) and it is generally known that what contributes to the strength of Portland cement clinker is mainly alite. Alite is the solid solution of $C_3S$ (here and hereinafter S represents $SiO_2$), containing solid solution of such impurities as MgO, $Al_2O_3$, $Fe_2O_3$, etc. up to approximately 1–2 percent by weight. It has recently been made clear that the strength of clinker varies notably according to kinds of such impurities in solid solution.

Accordingly, the inventors of this invention have been conducting studies with a view to producing extra high 1-day compressive strength Portland cement, by including solid solution of $Cr_2O_3$ in addition to the solid solution of the above mentioned impurities in the composition of alite, so as to improve its hydraulic characteristic.

Studies to produce early compressive strength Portland cement from clinker which is produced by adding $Cr_2O_3$ to raw materials for clinker and burning the mixture have already been reported, but those studies point out that the maximum 3-days compressive strength is attained where $Cr_2O_3$ content in clinker is in the neighborhood of 1 percent by weight, and that early compressive strength of Portland cement cannot be obtained, if $Cr_2O_3$ content in clinker is increased or decreased from the above mentioned per centage (1 percent).

The present inventors, however, have come out with the findings after systematic studies in regard to the chemical composition of early-strength Portland cement clinker that the maximum solid solubility of $Cr_2O_3$ is the highest in interstitial materials, followed by belite, while alite is the lowest in interstitial materials, and that where the content of $Cr_2O_3$ in alite is increased, 1-day compressive strength of early strength Portland cement is augmented, and furthermore that where the content of $Cr_2O_3$ in clinker is 1.2–2.6 percent, 1-day compressive strength, not to speak of 3-days compressive strength, increased sharply.

Below, only representatives of many experiments that have been conducted will be reviewed.

BRIEF DESCRIPTION OF THE SEVERAL VIEWS OF THE DRAWINGS

The figures show the results of experiments.

FIGS. No. 1–No. 3 show the changes in the 1-day compressive strength in accordance with variations in $Cr_2O_3$ content, ($Al_2O_3+Fe_2O_3$) content and particular lime saturation degree.

DETAILED DESCRIPTION

Table No. 1 shows chemical analysis values of raw materials used to produce extra high early-strength Portland cement.

TABLE 1

| Raw materials | Percent | | | | | | | | | | |
|---|---|---|---|---|---|---|---|---|---|---|---|
| | Ig. loss | SiO$_2$ | Al$_2$O$_3$ | Fe$_2$O$_3$ | Cr$_2$O$_3$ | CaO | MgO | SO$_3$ | Na$_2$O | K$_2$O | Total |
| Lime stone | 43.7 | 0.3 | 0.3 | 0.1 | | 55.2 | 0.6 | | | | 100.2 |
| Clay | 7.7 | 60.5 | 16.5 | 17.1 | | 1.5 | 3.2 | | 1.88 | 1.42 | 99.8 |
| Siliceous material | 3.6 | 83.2 | 8.3 | 3.2 | | 0.4 | 0.9 | | 0.00 | 0.16 | 99.4 |
| Copper slag | −4.4 | 35.8 | 8.1 | 47.4 | | 6.3 | 2.4 | | 0.60 | 0.83 | 97.0 |
| Chromite | 0.0 | 4.4 | 26.4 | 15.2 | 33.8 | 0.8 | 17.1 | | | | 97.7 |
| Gypsum | 21.2 | | 0.2 | | | 32.5 | | 46.1 | | | 100.0 |
| Serpentinite | 12.2 | 39.1 | 32.8 | 11.1 | | 2.0 | 33.3 | | | | 100.5 |

Where the component materials shown in Table No. 1 were used, $Cr_2O_3$ content was altered to meet the below-mentioned conditions. The mixed materials were pulverized so as to pass 99 percent by weight through 88 $\mu$ sieve. (Hereinafter numerical values are by weight unless otherwise mentioned).

CONDITION 1.

In order to make the composition of clinker substantially a mixture of $C_3S$, $C_4AF$ and $C_3A$ (note: $C_2S$ is not included), the particular lime saturation degree (hereinafter abridged as particular L.S.D.) was worked out as follows:

$$\frac{CaO + 1.39\ MgO}{2.80\ (SiO_2 + 0.79\ Cr_2O_3) + 1.65\ Al_2O_3 + 0.35\ Fe_2O_3} = 1.00$$

The above particular L.S.D. was worked out by the following calculation:

On the supposition that the composition of cement minerals consists of $C_3S$–$C_3A$–$C_4AF$ system and L.S.D. of said composition is calculated by Bogue's method so as to be equal to 1.00, the L.S.D. may be shown as follows:

$$L.S.D. = \frac{C}{3S + 4F + 3(A-F)} = \frac{C}{3S + 3A + F} \quad (2)$$

where C=CaO mole, S=SiO$_2$ mole, A=Al$_2$O$_3$ mole and F=Fe$_2$O$_3$ mole.

Let us suppose that M (i.e., MgO) replaces C (i.e., CaO) in an equal mole ratio. When Cr (i.e., $Cr_2O_3$) is added, it will form a solid solution of the form $6CaO.Cr_2O_3$, i.e., $C_6Cr$. Accordingly, when M and Cr are introduced in the equation (2), the next equation (3) is worked out. The equation (3) is named "particular L.S.D." by us.

$$Particular\ L.S.D. = \frac{C + M}{3S + 6Cr + 3A + F}$$

where M=MgO mole and Cr=Cr$_2$O$_3$ mole. When C,S,A,F,M, and Cr are represented by weight per cent, the above equation (1) is induced from the equation (3).

CONDITION 2.

$Al_2O_3 + Fe_2O_3 = 7.4\%$

Iron modulus = $Al_2O_3/Fe_2O_3 = 1.65$

Figure 1:
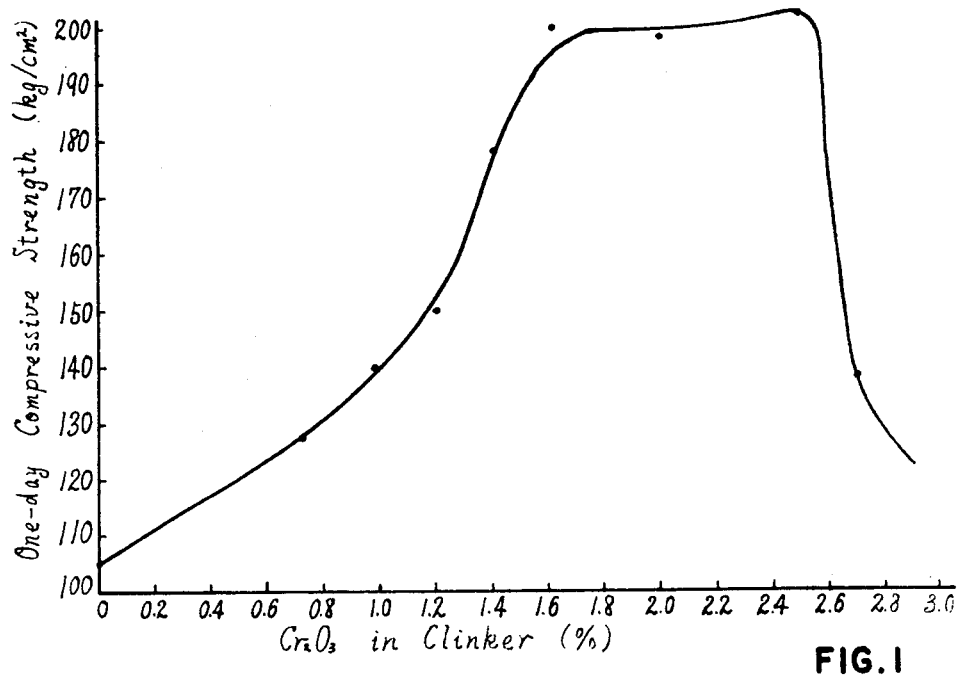

Mixed materials thus prepared were burned in an electric furnace at 1,500° C. for 1 hour, and to the clinker thus obtained gypsum (2.5% as $SO_3$) as shown in Table No. 1 was added. The mixture was then pulverized so that the cement had the specific surface area of 4,600 cm.$^2$/g. by the Blaine method. Strength test was conducted on the cement thus produced by the Japanese Industrial Standards, JISR-5201 (1964). The size of tested sample specimen was 4×4×4 cm. The results of strength tests are shown in Table 2. Also changes in 1-day compressive strength in accordance with the varied content of $Cr_2O_3$ are shown in FIG. 1.

consisting of particular L.S.D. 1.00 and $Cr_2O_3$ 2.0 percent was altered, and clinkers were made in the same manner described in the above, to which gypsum was added and the mixture was pulverized. The strength tests were conducted on the cement thus produced. The results are shown in Table 3, and the change in 1-day compressive strength in accordance with the varied contents of $R_2O_3$ is show in FIG. 2.

Figure 2:
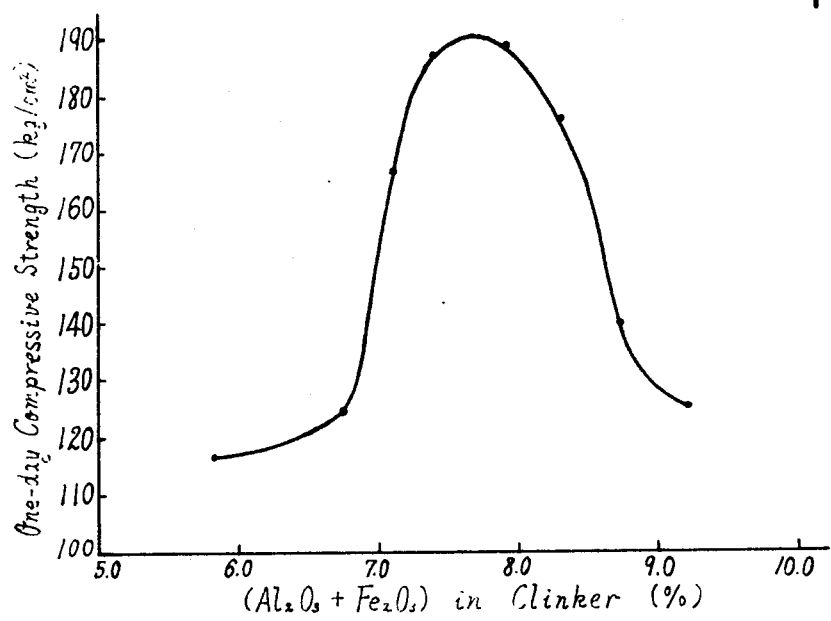

It became clear from Table 3 and FIG. 2 that extra high early-strength Portland cement having 1-day compressive strength upwards of 150 kg./cm.$^2$ was obtained where particular L.S.D. = 1.00 and $Cr_2O_3$ = 2.0%, $R_2O_3$ content = 7.0–8.6%,

TABLE 2-a

| Sample Number | Percent | | | | | | | | Total | SM | IM | Particular L.S.D. | F-CaO, percent |
|---|---|---|---|---|---|---|---|---|---|---|---|---|---|
| | $SiO_2$ | $Al_2O_3$ | $Fe_2O_3$ | $Cr_2O_3$ | CaO | MgO | $Na_2O$ | $K_2O$ | | | | | |
| 1 | 22.0 | 4.6 | 2.8 | 0.0 | 68.3 | 1.5 | 0.44 | 0.36 | 100.0 | 3.0 | 1.6 | 1.00 | 0.6 |
| 2 | 21.4 | 4.6 | 2.8 | 0.7 | 68.2 | 1.5 | 0.37 | 0.29 | 99.9 | 2.9 | 1.6 | 1.00 | 0.5 |
| 3 | 21.2 | 4.6 | 2.8 | 1.0 | 68.3 | 1.5 | 0.29 | 0.24 | 99.9 | 2.9 | 1.6 | 1.00 | 0.6 |
| 4 | 21.1 | 4.6 | 2.8 | 1.2 | 68.5 | 1.5 | 0.26 | 0.18 | 100.1 | 2.9 | 1.6 | 1.00 | 0.6 |
| 5 | 20.9 | 4.6 | 2.8 | 1.4 | 68.5 | 1.5 | 0.23 | 0.17 | 100.1 | 2.8 | 1.6 | 1.01 | 0.5 |
| 6 | 20.7 | 4.6 | 2.8 | 1.6 | 68.6 | 1.5 | 0.21 | 0.15 | 100.2 | 2.8 | 1.6 | 1.01 | 0.6 |
| 7 | 20.5 | 4.6 | 2.8 | 2.0 | 68.2 | 1.5 | 0.15 | 0.10 | 99.8 | 2.8 | 1.6 | 1.00 | 0.9 |
| 8 | 20.2 | 4.6 | 2.8 | 2.5 | 68.7 | 1.5 | 0.08 | 0.03 | 100.4 | 2.7 | 1.6 | 1.00 | 0.7 |
| 9 | 20.0 | 4.6 | 2.8 | 2.7 | 68.5 | 1.5 | 0.05 | 0.01 | 100.2 | 2.7 | 1.6 | 1.00 | 2.5 |
| 10 | 19.8 | 4.6 | 2.8 | 2.9 | 68.6 | 1.5 | 0.02 | 0.00 | 100.2 | 2.7 | 1.6 | 1.00 | 2.4 |

TABLE 2-b

| Sample Number | Specific surface (Blaine) cm.$^3$/g. | Compressive strength, kg./cm.$^2$ | | | Observation through a microscope | | |
|---|---|---|---|---|---|---|---|
| | | 1 day | 3 days | 4 weeks | Color of alite | Others | |
| 1 | 4,690 | 105 | 204 | 422 | Colorless | Belite ($C_2S$) was not included. | When mixed materials was burned for 30 minutes at 1,500° C., Belite and F-CaO was included in clinker. |
| 2 | 4,550 | 126 | 235 | 431 | Very pale green. | do | |
| 3 | 4,570 | 140 | 256 | 445 | do | do | |
| 4 | 4,530 | 150 | 245 | 477 | Pale green | do | |
| 5 | 4,520 | 177 | 260 | 484 | do | do | |
| 6 | 4,510 | 199 | 284 | 489 | Green | do | |
| 7 | 4,520 | 197 | 292 | 472 | do | do | |
| 8 | 4,700 | 201 | 275 | 481 | do | do | |
| 9 | 4,550 | 138 | 230 | 411 | do | Belite and F-CaO was included. | |
| 10 | 4,530 | 122 | 210 | 440 | do | do | |

TABLE 3

| Sample No. | Percent | | | | | | | | Total | $R_2O_3$ | SM | IM | Particular L.S.D. | F. CaO, percent | Specific surface (Blaine), cm.$^2$/g. | One-day compressive strength kg./cm.$^2$ |
|---|---|---|---|---|---|---|---|---|---|---|---|---|---|---|---|---|
| | $SiO_2$ | $Al_2O_3$ | $Fe_2O_3$ | $Cr_2O_3$ | CaO | MgO | $Na_2O$ | $K_2O$ | | | | | | | | |
| 1 | 21.6 | 3.6 | 2.2 | 1.9 | 69.0 | 1.6 | 0 | 0.01 | 99.9 | 5.8 | 3.7 | 1.6 | 1.00 | 1.0 | 4,580 | 117 |
| 2 | 21.1 | 4.2 | 2.6 | 2.0 | 68.5 | 1.5 | 0.06 | 0.01 | 100.0 | 6.8 | 3.1 | 1.6 | 1.00 | 0.7 | 4,520 | 125 |
| 3 | 20.8 | 4.4 | 2.7 | 2.0 | 68.5 | 1.5 | 0.11 | 0.06 | 100.1 | 7.1 | 2.9 | 1.6 | 1.00 | 0.8 | 4,660 | 167 |
| 4 | 20.5 | 4.6 | 2.8 | 1.9 | 68.4 | 1.5 | 0.15 | 0.09 | 99.9 | 7.4 | 2.8 | 1.7 | 1.00 | 0.9 | 4,560 | 187 |
| 5 | 20.4 | 4.7 | 2.8 | 1.9 | 68.4 | 1.5 | 0.15 | 0.10 | 100.1 | 7.5 | 2.7 | 1.7 | 1.00 | 0.8 | 4,680 | 195 |
| 6 | 20.1 | 4.9 | 3.0 | 1.9 | 68.2 | 1.5 | 0.22 | 0.15 | 100.0 | 7.9 | 2.5 | 1.6 | 1.01 | 0.7 | 4,650 | 190 |
| 7 | 20.1 | 5.0 | 3.0 | 1.9 | 67.9 | 1.5 | 0.23 | 0.20 | 99.8 | 8.0 | 2.1 | 1.7 | 1.00 | 0.5 | 4,570 | 185 |
| 8 | 19.8 | 5.2 | 3.1 | 1.9 | 67.8 | 1.5 | 0.26 | 0.29 | 99.8 | 8.3 | 2.4 | 1.7 | 1.01 | 0.6 | 4,610 | 175 |
| 9 | 19.6 | 5.4 | 3.3 | 1.9 | 67.7 | 1.5 | 0.31 | 0.35 | 100.1 | 8.7 | 2.2 | 1.6 | 1.01 | 0.3 | 4,630 | 141 |

It is clear from Table 2 and FIG. 1 that clinkering was best facilitated, and Portland cement, having 1-day compressive strength upwards of 150 kg./cm.$^2$ was obtained where particular L.S.D. = 1.00, ($Al_2O_3+Fe_2O_3$) content=7.4 percent, $Al_2O_3/Fe_2O_3$ ratio = 1.65 and $Cr_2O_3$ content = 1.2–2.6%, more preferably 1.6–2.4%.

Where $Cr_2O_3$ contents=less than 1.2 percent, the content of $Cr_2O_3$ solid solution in alite was insufficient and, therefore, 1-day compressive strength did not increase satisfactorily, and when $Cr_2O_3$ content=more than 2.6 percent, alite decomposed to belite and CaO and 1-day compressive strength of cement dropped sharply, because $Cr_2O_3$ content was over the limit of solid solution of alite and of interstitial materials.

Next, mixed materials were prepared so that the content of $R_2O_3=Al_2O_3+Fe_2O_3$ (in case of $Al_2O_3/R_2O_3=1.65$) in clinker preferably 7.2–7.8%, and $Al_2O_3=1.65$.

In other experiments, it was found that where the $Cr_2O_3$ content in clinker varied in the range of 1.2–2.6 percent, the result of the same tendency was observed, and the same was true when the ratio of $Al_2O_3/Fe_2O_3$ varied 1.65±0.50.

Where $R_2O_3$ content was less than 7.0 percent, solid phase reaction took place partially or uneven chemical reaction took place, due to the shortage of interstitial materials content, and therefore, $Cr_2O_3$ was unevenly melted in alite, and 1-day compressive strength of cement dropped. On the other hand, where $R_2O_3$ content was more than 8.6 percent, interstitial materials content which contained more $Cr_2O_3$ than alite increased, causing the $Cr_2O_3$ content in alite to decrease, and also the relative content of alite in clinker decreased, and accordingly, 1-day compressive strength dropped.

Figure 3:
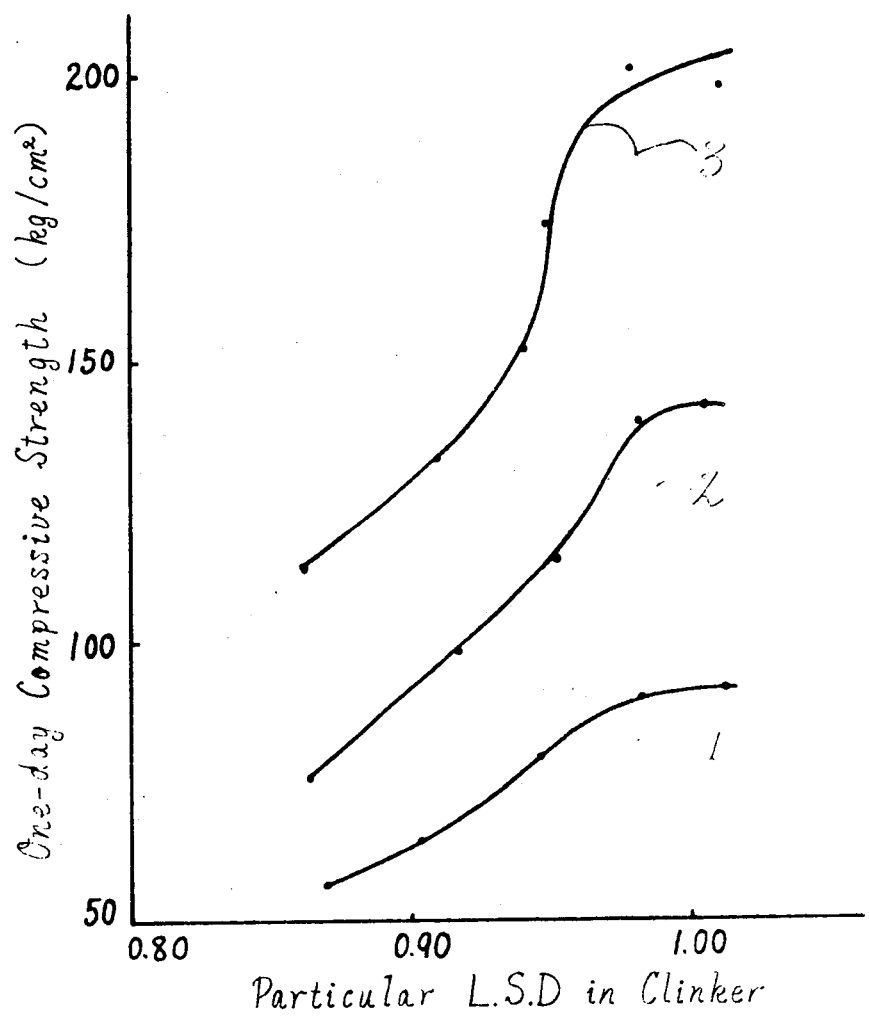

Furthermore, in order to test changes in the 1-day compressive strength of cement mortars in which particular L.S.D. varied, the following three different clinker compositions were prepared, namely, 1. $Cr_2O_3=0\%$, $Al_2O_3+Fe_2O_3=7.0\%$, $Al_2O_3/Fe_2O_3=1.65$
2. $Cr_2O_3=1.0\%$, $Al_2O_3+Fe_2O_3=7.0\%$, $Al_2O_3/Fe_2O_3=1.65$
3. $Cr_2O_3=2.0\%$, $Al_2O_3+Fe_2O_3=7.3\%$, $Al_2O_3/Fe_2O_3=1.65$, and cements of three kinds were produced in the same manner described above. Tests of their 1-day compressive strength were conducted on the cement mortars. Their results are shown in FIG. 3. The test results shown in FIG. 3 were numbered so as to correspond to the numbers of the above-mentioned clinkers.

From the results, it became clear that due to increase in the particular L.S.D., 1-day compressive strength rose at the higher rate, especially when $Cr_2O_3$ content increased, and that the rate of increase became greater when the particular L.S.D. = 0.95 or thereabout. Furthermore, it was found that when the particular L.S.D. = 1.00 and upwards, little changes took place in the 1-day compressive strength. But when the particular L.S.D. became higher than 1.00, burnability of clinker became difficult to the extent that clinker could not be burned in a rotary kiln. For this reason, the highest value of the particular L.S.D. is preferably set at 1.03. Next, where the particular L.S.D. = less than 0.95, belite content increased, and as the content of $Cr_2O_3$ solid solution in belite which was greater than that in alite and the content of $Cr_2O_3$ solid solution in alite decreased, 1-day compressive strength of cement dropped sharply.

To summarize the experiments results, it was made clear that where the cement produced from the clinker, composition of which was: the particular L.S.D. = 0.95–1.03, $Cr_2O_3=$ 1.2–2.6%, $(Al_2O_3+Fe_2O_3)$ = 7.0–8.6%, $Al_2O_3/Fe_2O_3=1.65 \pm 0.50$, pulverized, after gypsum was added, to the extent that the value of specific surface area by the Blaine method was $4,600 \pm 100$ cm.$^2$/g., its early compressive strength was high up to 150–210 kg./cm.$^2$, and that where the value of specific surface area by the Blaine method was $5,600 \pm 100$ cm.$^2$/g., its early compressive strength was extra high up to 220–250 kg./cm.$^2$. In this case, the content of gypsum to be added to clinker is preferably 2.2–3.5 percent as $SO_3$ in cement.

When 1-day compressive strength upwards of 160 kg./cm.$^2$ is required under this invention where the value of the specific surface are by the Blaine method is $4,600 \pm 100$ cm.$^2$/g., the composition of clinker could be: particular L.S.D. = 0.97–1.03, $Cr_2O_3$ =1.2–2.6%, $Al_2O_3+Fe_2O_3=$ 7.2–8.0%, $Al_2O_3/Fe_2O_3$ =1.65±0.30, or particular L.S.D. = 0.98–1.02, $Cr_2O_3$ =1.6–2.4%, $Al_2O_3+Fe_2O_3$ =7.0–8.6%, $Al_2O_3/Fe_2O_3$ =1.65±0.30, and furthermore, where the value of specific surface area by the Blaine method is $4,600 \pm 100$ cm.$^2$/g., and cement having one-day compressive strength of 190–210 kg./cm.$^2$ is required, the clinker composition must be: particular L.S.D. = 0.98–1.01, $Cr_2O_3=$1.6–2.4%, $Al_2O_3+Fe_2O_3$ =7.2–8.0%, $Al_2O_3/Fe_2O_3=$1.65±0.20.

In order to produce extra high early-strength Portland cement according to this invention, lime stone, clay, silicious material, copper slag and chromite are mixed so as to make clinker composition as mentioned above and the mixed materials are pulverized so as to pass 99 percent by weight through 88 $\mu$ sieve, and then they are burned to make clinker at 1450–1600° C. Gypsum (2.2–3.5% as $SO_3$) 3) is added to clinker and the mixture is pulverized. In the course of burning, part of $Cr_2O_3$ composition may evaporate, so it is recommended to mix chromite about 10 percent more to make up decrease in $Cr_2O_3$ composition.

Extra high early-strength Portland cement produced according to this invention has not only 1-day compressive strength upwards of 150 kg./cm.$^2$ but its long range strength is stabilized, and its contractibility, its chemical resistance and its workability compare favorably with the ordinary Portland cement.

EXAMPLE:

Materials consisting of lime stone, clay, silicious material, copper slag, chromite, as mentioned in Table No. 1 were mixed at the rate of 1,000:0.076:0.130,011:0.048 respectively, and the mixed materials were pulverized so as to pass 99 percent by weight through 88 $\mu$ sieve. The pulverized, mixed materials were placed in a rotary kiln having the length of 8.34 m., inside diameter of 0.45 m., placed at an incline of 5/100, with the number of rotations =60 r.p.m. and were burned at over 1,500° C. into clinker and 30 kg./hr. of clinker were produced. Gypsum (2.5 percent as $SO_3$) as shown in Table No. 1 was added, and the mixture was pulverized by ball mill (length=37 cm., the inside diameter =44 cm., the number of rotations = 45 r.p.m.) The cement thus obtained was tested in accordance with JISR 5201 (1964) in respect of powdery fineness, setting and compressive strength. The obtained results were as shown in Table No. 4.

TABLE 4.—COMPOSITIONS OF CLINKER

| Percent | | | | | | | | | Particular L.S.D. | F. CaO, percent | HM | SM | IM | |
|---|---|---|---|---|---|---|---|---|---|---|---|---|---|---|
| $SiO_2$ | $Al_2O_3$ | $Fe_2O_3$ | $Cr_2O_3$ | CaO | MgO | $Na_2O$ | $K_2O$ | Total | | | | | | |
| 20.1 | 4.9 | 2.9 | 2.1 | 68.2 | 1.5 | 0.22 | 0.15 | 100.1 | 1.01 | 0.9 | 2.44 | 2.6 | 1.7 | Belite was not observed through a microscope |

| Setting test of cement | | | Degree of fineness of cement | | Strength test of cement | | | | | | | |
|---|---|---|---|---|---|---|---|---|---|---|---|---|
| Amount of water, percent | Initial setting time, hr. min. | Final setting time, hr. min. | Flow, mm. | Residue over 88μ sieve, wt. percent | Specific surface (Blaine), cm.$^2$/g. | Bending strength, kg./cm.$^2$ | | | | Compressive strength, kg./cm.$^2$ | | | |
| | | | | | | 1 day | 3 days | 7 days | 4 weeks | 1 day | 3 days | 7 days | 4 weeks |
| 36.5 | 1–10 | 1–45 | 228 | 0.1 | 4,620 | 47.3 | 53.6 | 68.0 | 80.0 | 215 | 294 | 390 | 520 |

What is claimed is:

1. Extra high early-strength Portland cement prepared by pulverizing clinker having compositions: the particular L.S.D. = 0.95–1.03, $Cr_2O_3$ content = 1.2–2.6% by weight, $(Al_2O_3+Fe_2O_3)$ content = 7.0–8.6% by weight and weight ratio of $Al_2O_3/Fe_2O_3=1.65\pm0.50$.

2. Extra high early-strength Portland cement according to claim 1, in which said clinker has compositions: the particular L.S.D. 0.97–1.03, $Cr_2O_3$ content = 1.2–2.6% by weight, $(Al_2O_3+Fe_2O_3)$ content = 7.2–8.00% by weight and weight ratio of $Al_2O_3/Fe_2O=1.65\pm0.30$.

3. Extra high early-strength Portland cement according to claim 1, in which said clinker has compositions: the particular L.S.D. 0.98–1.02, $Cr_2O_3$ content = 1.6–2.4% by weight, $(Al_2O_3+Fe_2O_3)$ content = 7.9–8.6% by weight and weight ratio of $Al_2O_3/Fe_2O_3=1.65\pm0.30$.

4. Extra high early-strength Portland cement according to claim 1, in which said clinker has compositions: the particular L.S.D. 0.98–1.01, $Cr_2O_3$ content = 1.6–2.4% by weight, $(Al_2O_3+Fe_2O_3)$ content = 7.2–8.0% by weight and weight ratio of $Al_2O_3/Fe_2O_3=1.65\pm0.20$.

* * * * *